UNITED STATES PATENT OFFICE.

ARTHUR F. WENDT, OF NEW YORK, N. Y.

PROCESS OF EXTRACTING COPPER FROM PYRITES.

SPECIFICATION forming part of Letters Patent No. 345,401, dated July 13, 1886.

Application filed January 11, 1886. Serial No. 188,225. (No specimens.)

*To all whom it may concern:*

Be it known that I, ARTHUR F. WENDT, of the city, county, and State of New York, have invented certain new and useful Improvements in Process of Extracting Copper from Pyrites, of which the following is a specification.

This invention relates to an improved process of extracting copper from pyrites or sulphuretted copper ores; and it consists of a process of extracting copper from pyrites by kernel-roasting the same, crushing the roasted ore, leaching the crushed ore, separating the oxidized ore by leaching and simultaneously concentrating the kernels, and, finally, recovering the copper contained in said kernels.

In carrying out my invention the pyrites are carefully and slowly roasted under a cover of fine ore in piles or stalls, and in such manner that a kernel of copper sulphuret is obtained. This kernel-roasted ore is crushed and screened by being passed through a sieve with about four meshes to the inch. Two tons of this crushed ore are gradually charged into a wooden tank of about one hundred and fifty gallons capacity, which is filled with diluted sulphuric acid or any other suitable solvent. In the center of the tub is arranged a vertical shaft, which is provided at the lower part with two or more horizontal blades, and which is rotated by gear-wheels applied to the top of the vertical shaft. The rotating blades keep the liquor in the tank continuously in motion. In about two hours the oxidized portions of the crushed ore will be leached and suspended in the liquor in the tank. The vertical stirrer-shaft is then rotated at a slower speed, so that the particles or kernels of sulphide of copper are concentrated and collected by their greater specific gravity at the bottom of the tank, while the oxidized ore will remain in suspension. The leaching liquor, with the suspended particles of oxidized ore, is then drawn off, while the stirrer-blades are kept in motion. The leaching liquor is then allowed to stand, so that the crushed oxidized ore will settle at the bottom. The supernatant clear liquor, carrying the copper in solution, is treated for the metals it contains by any suitable process, preferably by precipitating any silver by metallic copper, and then precipitating the copper by means of metallic iron.

Any solvent may be employed in the leaching-tanks; but it is preferable to use a weak solution of sulphurous and sulphuric acids, which is obtained by injecting these gases, together with steam, into the leaching-tank. The gases are obtained from the roasting of the pyrites, and are injected by any suitable forcing appartus, preferably by a Korting injector. An incidental advantage of this process is that the iron in the liquor is reduced to protosulphate, and that it prevents the excessive consumption of iron in precipitating the copper.

The kernels of crushed ore remaining at the bottom of the leaching-tank, are washed out of the same by a stream of water. This water is then added to the leaching liquor of a new charge, so as to utilize the small quantity of copper dissolved in it.

If the process is properly carried out, the kernels are from one to three per cent. richer than the raw ore, which ore assays about three per cent. They may be returned to the roast piles, and used as covers for the lump ore. By this means they are agglomerated and can be roasted, and if sufficiently rich, smelted, or if not sufficiently rich for that purpose, again passed through the leaching-tubs.

Having thus described my invention, I claim as new, and desire to secure by Letters Patent—

1. The process of extracting copper from pyrites, which consists in kernel-roasting said pyrites, crushing the same, leaching the oxidized ore, and simultaneously separating it from the sulphurets by concentrating the kernels, substantialy as set forth.

2. The process described of extracting copper from pyrites, which consists of the following steps: first, kernel-roasting the pyrites; second, crushing the kernel-roasted pyrites; third, leaching the crushed pyrites and simultaneously concentrating the kernels; fourth, decanting the leaching liquor and separating the oxidized ore held in suspension and precipitating the copper held in solution, and, fifthly, treating the concentrated kernels for recovering the copper, substantially as set forth.

In testimony that I claim the foregoing as my invention I have signed my name in presence of two subscribing witnesses.

ARTHUR F. WENDT.

Witnesses:
PAUL GOEPEL,
SIDNEY MANN.